United States Patent
Shimano et al.

(10) Patent No.: US 9,915,764 B2
(45) Date of Patent: Mar. 13, 2018

(54) DIFFRACTIVE LENS AND OPTICAL DEVICE USING THE SAME

(71) Applicant: Hitachi Maxell, Ltd., Osaka (JP)

(72) Inventors: Takeshi Shimano, Tokyo (JP); Hiroyuki Kajikawa, Ibaraki (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 14/731,275

(22) Filed: Jun. 4, 2015

(65) Prior Publication Data
US 2015/0362643 A1 Dec. 17, 2015

(30) Foreign Application Priority Data
Jun. 11, 2014 (JP) .................... 2014-120192

(51) Int. Cl.
G02B 5/18 (2006.01)
G02B 27/42 (2006.01)
G02B 19/00 (2006.01)

(52) U.S. Cl.
CPC ......... G02B 5/1876 (2013.01); G02B 5/1895 (2013.01); G02B 19/0061 (2013.01); G02B 27/425 (2013.01); G02B 27/4288 (2013.01)

(58) Field of Classification Search
CPC .......... G02B 5/18; G02B 5/32; G02B 5/1814; G02B 5/1861; G02B 5/1871; G02B 5/1876; G02B 5/1895; G02B 27/42; G02B 27/425; G02B 27/4288; G02B 27/46; G02B 19/00; G02B 19/0061; G02C 7/04; G02C 2202/20; A61B 3/0285

USPC ....... 359/563, 565, 566, 569, 571, 572, 574, 359/575, 15, 16, 19; 351/159.11, 159.12, 351/159.15
See application file for complete search history.

(56) References Cited

U.S. PATENT DOCUMENTS 5,446,565 A 8/1995 Komma et al.
5,589,982 A 12/1996 Faklis et al.
(Continued)

FOREIGN PATENT DOCUMENTS

CN 1707312 A 12/2005
JP 2000-511292 A 8/2000
(Continued)

OTHER PUBLICATIONS

Extended European Search Report EP Application No. 15170694.2-1562 dated Nov. 12, 2015.
(Continued)

Primary Examiner — Jie Lei
(74) Attorney, Agent, or Firm — McDermott Will & Emery LLP

(57) ABSTRACT

An object of the present application is to thin a thick lens used in an automobile headlamp optical system and a projector lighting optical system while maintaining the optical properties of the lens. A diffractive lens includes, on at least one surface, an optical surface with a plurality of areas defined by a plurality of steps. A blaze wavelength of the diffractive lens is within a wavelength spectral range of a light source used. An optical path difference between adjacent areas at the blaze wavelength is larger than a coherence length of the light source. The diffractive lens substantially acts as a Fresnel lens at a wavelength other than the blaze wavelength.

13 Claims, 14 Drawing Sheets

(56) References Cited

U.S. PATENT DOCUMENTS

| | | | |
|---|---|---|---|
| 5,801,889 A * | 9/1998 | Meyers | G02B 5/1876 |
| | | | 359/520 |
| 5,982,543 A | 11/1999 | Fiala | |
| 7,750,359 B2 * | 7/2010 | Narendran | B82Y 10/00 |
| | | | 257/98 |
| 2001/0055156 A1 | 12/2001 | Maruyama | |
| 2011/0279998 A1 * | 11/2011 | Su | H01L 33/46 |
| | | | 362/84 |

FOREIGN PATENT DOCUMENTS

| | | |
|---|---|---|
| JP | 2001-249271 A | 9/2001 |
| JP | 2013-182264 A | 9/2013 |
| JP | 2013-200367 A | 10/2013 |

OTHER PUBLICATIONS

Donald W. Sweeney et al., "Harmonic Diffactive Lenses", 2219 Applied Optics 34 May 10, 1995, No. 14, Washington DC, pp. 2469-2475.

Dean Faklis et al., "Spectral properties of multiorder diffractive lenses", Applied Optics, vol. 34, No. 14, May 10, 1995, pp. 2462-2468.

Notification of First Examination Report issued in corresponding Chinese Patent Application No. 201510303588.2, dated Sep. 1, 2016. (w/partial English translation).

Office Action issued in corresponding Japanese Patent Application No. 2014-120192, dated Sep. 1, 2017.

* cited by examiner

FIG. 2

| ANNULUS NUMBER | INNER RADIUS | OUTER RADIUS | ANNULUS WIDTH | ANNULUS COEFFICIENT | | | |
|---|---|---|---|---|---|---|---|
| m | r[mm] | r[mm] | [mm] | am0 | am2 | am4 | am6 |
| 0 | 0 | 1.24995272 | 1.2499527 | 0 | −0.028698 | −9.322E−07 | 0 |
| 1 | 1.2499953 | 2.16553876 | 0.915586 | 0.0334286 | −0.028669 | −7.068E−06 | 1.39E−08 |
| 2 | 2.165539 | 2.79641174 | 0.630873 | 0.0668586 | −0.028651 | −6.89E−06 | −1.6E−09 |
| 3 | 2.796412 | 3.30960823 | 0.5131965 | 0.1002926 | −0.028634 | −6.744E−06 | −5.6E−09 |
| 4 | 3.309608 | 3.75371349 | 0.44410053 | 0.1337125 | −0.028614 | −6.952E−06 | 1.05E−09 |
| 5 | 3.753713 | 4.15096659 | 0.39725310 | 0.1671452 | −0.028596 | −6.902E−06 | 2.9E−10 |
| 6 | 4.150967 | 4.51375894 | 0.3627924 | 0.2005635 | −0.028575 | −7.052E−06 | 3.67E−09 |
| 7 | 4.513759 | 4.84983331 | 0.3360742 | 0.2340435 | −0.028564 | −6.655E−06 | −3.1E−09 |
| 8 | 4.849833 | 5.16441206 | 0.314579 | 0.2673663 | −0.028533 | −7.196E−06 | 4.5E−09 |
| 9 | 5.164412 | 5.46121431 | 0.2968022 | 0.3007507 | −0.028511 | −7.284E−06 | 5.11E−09 |
| 10 | 5.461214 | 5.74299998 | 0.2817857 | 0.3339806 | −0.028473 | −7.892E−06 | 1.16E−08 |
| ⋮ | ⋮ | ⋮ | ⋮ | ⋮ | ⋮ | ⋮ | ⋮ |
| 210 | 28.93328 | 29.0777656 | 0.1444886 | −0.098024 | 0.0054834 | −5.152E−05 | 2.41E−08 |
| 211 | 29.07777 | 29.22832292 | 0.1505636 | 3.2902201 | −0.00642 | −3.738E−05 | 1.85E−08 |
| 212 | 29.22833 | 29.38861858 | 0.1578566 | 2.7647617 | −0.004442 | −3.966E−05 | 1.94E−08 |
| 213 | 29.38619 | 29.55529978 | 0.166812 | 0.7846873 | 0.0025351 | −4.767E−05 | 2.24E−08 |
| 214 | 29.553 | 29.7311338 | 0.178136 | 2.519228 | −0.003319 | −4.09E−05 | 1.98E−08 |
| 215 | 29.73113 | 29.92419989 | 0.1930651 | 3.2220095 | −0.005581 | −3.83E−05 | 1.88E−08 |
| 216 | 29.9242 | 30.138171 | 0.2139721 | 2.1466794 | −0.001863 | −4.24E−05 | 2.03E−08 |
| 217 | 30.13817 | 30.38437330 | 0.2462023 | 3.6006922 | −0.006554 | −3.718E−05 | 1.84E−08 |
| 218 | 30.38437 | 30.69038260 | 0.3060093 | 3.7273399 | −0.006853 | −3.681E−05 | 1.82E−08 |
| 219 | 30.69038 | 31.17 | 0.4796174 | 11.065746 | −0.029938 | −1.244E−05 | 9.65E−09 |

FIG. 13

| ANNULUS NUMBER | INNER RADIUS(mm) | OUTER RADIUS(mm) | ANNULUS WIDTH(mm) | am0 | am2 | am4 | am6 |
|---|---|---|---|---|---|---|---|
| 0 | 0 | 0.5513198 | 0.5513198 | 0 | 0 | 0.001156 | 0 |
| 1 | 0.5513198 | 0.9487518 | 0.397432 | 0.014489 | −0.26767 | 0.000627 | −0.00034 |
| 2 | 0.9487518 | 1.2176843 | 0.2689325 | 0.028963 | −0.26718 | 0.000625 | −0.00032 |
| 3 | 1.2176843 | 1.4335029 | 0.2158186 | 0.043333 | −0.26651 | 0.000523 | −0.00029 |
| 4 | 1.4335029 | 1.6188088 | 0.1853059 | 0.057416 | −0.2655 | 0.000298 | −0.00024 |
| 5 | 1.6188088 | 1.7845211 | 0.1657123 | 0.07079 | −0.26382 | −0.00012 | −0.00018 |
| 6 | 1.7845211 | 1.9373578 | 0.1528367 | 0.082712 | −0.261 | −0.00081 | −0.00011 |
| 7 | 1.9373578 | 2.0823786 | 0.1450208 | 0.091669 | −0.2562 | −0.00191 | −4.9E−06 |
| 8 | 2.0823786 | 2.2244131 | 0.1420345 | 0.09474 | −0.24796 | −0.00364 | 0.000132 |
| 9 | 2.2244131 | 2.3698233 | 0.1454101 | 0.086019 | −0.23361 | −0.00637 | 0.000317 |
| 10 | 2.3698233 | 2.5319556 | 0.1621324 | 0.052661 | −0.20795 | −0.01075 | 0.000577 |
| 11 | 2.5319556 | 3.053447 | 0.5214914 | 0.681559 | −0.44808 | 0.020302 | −0.00074 |

DIFFRACTIVE LENS AND OPTICAL DEVICE USING THE SAME

INCORPORATION BY REFERENCE

The present application claims priority from Japanese application JP-2014-120192 filed on Jun. 11, 2014, the content of which is hereby incorporated by reference into this application.

BACKGROUND OF THE INVENTION

The present invention relates to an optical lens used for white light in a camera, a projector, a lighting device, and the like, and an optical device using the optical lens.

JP-A-2001-249271 is a related art in the field of the present invention. JP-A-2001-249271 discloses that "An objective lens 10 is a single lens formed of resin and both surfaces of which are aspheric, and a diffractive lens structure is formed on one lens surface 11 as an annulus-like pattern around an optical axis. At least one of the lens surfaces 11 and 12 is aspheric, and the objective lens 10, in serving as a refractive lens, excessively corrects spherical aberration. The diffractive lens structure is designed to have a predetermined spherical aberration based on steps formed at boundaries between annuli in the direction of an optical axis as in a Fresnel lens an that, for the lens as a whole, the spherical aberration does not change even when the refractive index changes." (see Abstract).

Furthermore, JP-A-2013-182264 is another related art in the field of the present invention. JP-A-2013-182264 discloses "A method for manufacturing a transmissive screen, including a step of preparing a first masking sheet 30 stuck to a surface of a Fresnel lens sheet 20 opposite to a surface of the Fresnel lens sheet 20 on which a Fresnel lens portion 22 is formed, a step of heating and softening a Fresnel lens sheet 10 with a masking sheet, and a step of placing the Fresnel lens sheet 10 with the masking sheet on a first mold 40 with a first mold surface 41 that is at least partly curved so that the first masking sheet 30 corresponds to the first mold surface 41 side and sucking air through a first suction hole 42 present in the first mold surface 41 to mold the Fresnel lens sheet 20 with the masking sheet such that the Fresnel lens sheet 20 has a curved surface."

Furthermore, JP-A-2013-200367 is another related art in the field of the present invention. JP-A-2013-200367 discloses that "In a Fresnel lens 1, a first surface 10 is a flat surface, and a second surface opposite to the first surface 10 has a plurality of (in an illustrated example, three) second lens surfaces 20. In the Fresnel lens 1, aspheric surfaces providing the respective lens surfaces 21 have different central axes CAO, CA1, and CA2, and the positions of foci F(FO), F(F1), and F(F2) of the lens surfaces 21 are misaligned with one another on one image surface I. An optical detector includes the Fresnel lens 1."

SUMMARY OF THE INVENTION

A diffractive lens is expected to be used for a monochromatic light source such as laser light. The usage efficiency of the diffractive lens decreases with increasing deviation of a wavelength from the blaze wavelength of a diffraction grating with a light source such as white light having a wide wavelength range. To suppress this as much as possible, the diffractive lens needs to be designed such that the optical path difference between adjacent annuli is reduced to one wavelength to allow first-order diffracted light to be utilized. However, the need of a high lens power leads to a reduced pitch between the annuli and degraded machinability. The use of nth diffracted light allows the pitch to be increased by a factor of n, but the usage efficiency decreases more significantly. To implement a lens which uses first-order diffracted light and which is used for a wide wavelength range without a decrease in efficiency, the lens power of the diffractive lens needs to be reduced so as to provide an annulus width sufficient to enable machining. Therefore, such an effect as reducing the thickness of a thick lens is not expected to be produced.

For the Fresnel lens, a thin lens can be easily provided by allowing a lens effect to be exerted based on geometric-optical refraction using a larger step amount and a larger annulus width than the diffractive lens to the degree that interference between the annuli is negligible. However, the lens is designed so as to be separated into areas at regular intervals in a thickness direction or a radial direction, so that the resultant areas are two-dimensionally arranged. Thus, a wavefront aberration property provided with an optical path length taken into account fails to be ensured, disadvantageously preventing optical performance from being ensured. The Fresnel lens is normally a flat lens, and is added to an optical refractive curved surface. The Fresnel lens is not designed with a lens power distribution taken into account.

JP-A-2001-249271 discloses a technique that uses a diffractive lens added to a curved surface of a refractive lens for a pickup in an optical disc to compensate for degradation of optical properties of the refractive lens caused by a change in the refractive index resulting from a change in temperature. However, the pickup lens is expected to be used with monochromatic laser light source, and the diffraction efficiency of the pickup lens disadvantageously decreases with increasing deviation from the blaze wavelength with white light having a wide wavelength range. To suppress a decrease in diffraction efficiency as much as possible, the optical path difference between the adjacent annuli needs to be reduced to one wavelength to allow first-order diffracted light to be used. Furthermore, the need of a high lens power disadvantageously leads to a reduced pitch of the diffraction structure, which makes manufacturing difficult. In this case, when high-order diffracted light can be used, the lens power can be increased, with the pitch increased to facilitate manufacturing. However, the use of the high-order diffracted light is precluded due to the above-described decrease in efficiency. Thus, the diffractive lens eventually fails to be provided with a high lens power. Therefore, an effect that reduces the thickness of the lens as is the case with the Fresnel lens is not much expected. The usage of the diffractive lens is limited to compensation for chromatic aberration or temperature deviation which can be dealt with by a low lens power.

JP-A-2013-182264 discloses a technique for forming a Fresnel lens on a curved surface. However, the curved surface is a surface of a screen and not a surface acting as a lens. Basically, the Fresnel lens is a lens that is two-dimensionally thinned by separating a curved refractive lens into a number of areas and translating the areas. Thus, the Fresnel lens disadvantageously has insufficient optical properties such as aberration performance.

JP-A-2013-200367 discloses that the lens surface of the Fresnel lens is shifted such that the lens areas into which the Fresnel lens is separated have different focal positions. However, this lens also results from thinning achieved by separating the original uniform curved lens into the lens areas and moving these areas. Thus, the lens also disadvantageously has insufficient optical properties such as aberration performance.

With the above-described problems in view, an object of the present application is to thin a thick lens used in an automobile headlamp optical system and a projector lighting optical system while maintaining the optical properties of the lens.

To accomplish the object, for example, a configuration recited in the claims is adopted.

The present application includes a plurality of means for accomplishing the object. By way of example, the means in claim 1 is "a diffractive lens having, on at least one surface, an optical surface with a plurality of areas defined by a plurality of steps, wherein a blaze wavelength of the diffractive lens is within a wavelength spectral range of a light source used, an optical path difference between adjacent areas at the blaze wavelength is longer than a coherence length of the light source, and the diffractive lens substantially acts as a Fresnel lens at a wavelength other than the blaze wavelength."

It is well known that, in diffractive lenses, an optical path of a ray of light calculated at the blaze wavelength in accordance with a phase function coincides with an optical path calculated on the assumption that the ray of light is geometric-optically refracted at a blaze surface. Thus, the diffractive lens is also equivalent to a geometric-optical refractive lens at the blaze wavelength. When the optical path difference between the adjacent areas is longer than the coherence length as recited in the claims, light interference needed for conventional diffractive lenses does not occur. Thus, such a lens is not substantially a diffractive lens but acts as a Fresnel lens that is a refractive lens. However, the diffractive lens is originally equivalent to the refractive lens at the blaze wavelength and is thus said to be a diffractive lens at the blaze wavelength even though the light interference does not occur. The diffractive lens can be precisely optically designed similarly to the refractive lens using commercially available optical design software and the above-described phase function. In that case, the diffractive lens can be easily provided onto a refractive curved surface. This property is not possessed by conventional Fresnel lenses. When the wavelength deviates from the blaze wavelength, the optical path calculated for the diffractive lens is misaligned with the optical path of a ray of light calculated for the geometric-optical lens. The optical design software traces only the optical path of a ray of light with a particular diffraction order, but in actuality, diffraction efficiency gradually decreases to gradually increase the diffraction efficiency of a ray of light with the adjacent diffraction order. The energy of light shifts to another diffraction order at a different diffraction angle. Then, the diffraction efficiency is maximized again at another blaze wavelength to reproduce conditions equivalent to conditions for the refractive lens. A diffraction angle of a particular order changes with a change in wavelength in a direction opposite to the direction of a change in the refraction angle of the refractive lens based on an refractive index dispersion property of an optical material. Thus, diffractive lenses utilizing first-order diffracted light have often been utilized to correct chromatic aberration of refractive lenses. However, the diffraction angle of the adjacent order to which the energy shifts changes discontinuously in the same direction as that of a change in the refraction angle of the refractive lens. On the other hand, in the refractive lens, the refraction angle changes smoothly with a change in the wavelength in accordance with the refractive index dispersion property. The relevant curve corresponds to a curve for a normal refractive lens which results from smooth connection of diffraction angles under the blaze condition for the diffractive lens. Therefore, the diffractive lens of the present application fails to produce an achromatic effect, which is exerted by the refractive lens using what is called a reverse dispersion property, but even when the wavelength deviates from the optically designed blaze wavelength, a change in the optical path of the diffractive lens of the present application is substantially equivalent to a corresponding change in the optical path of the normal refractive lens.

In claim 2, the lens is more specifically characterized in that "when the wavelength spectral range of the light source is defined by a range $2\Delta\lambda$ with a spectral intensity that is $1/e^2$ of a spectral intensity of a peak wavelength, the optical path difference between the adjacent areas is equal to or more than $\lambda B^2/\Delta\lambda$ with respect to a blaze wavelength $\lambda B$". This expression is an approximate expression for an overall width over which an amplitude of a packet attenuates to $1/e^2$ on the assumption that the spectrum of the light source conforms to a Gaussian distribution. The expression may fail to precisely reflect the coherence length when the spectrum is complicated but may be used as an indicator of the coherence length.

In claim 3, the lens is more specifically characterized in that "the light source is a non-laser light source in which the wavelength spectral range is at least 200 nm, and the optical path difference is at least five times as large as the blaze wavelength".

In claim 4, the lens is more specifically characterized in that "the areas are concentric annulus areas".

In claim 5, the lens is more specifically characterized in that "an envelope globally enveloping the steps on the optical surface with the plurality of areas has an on-axis curvature different from an on-axis curvature of another surface providing the diffractive lens and is a curved surface acting substantially as a lens". This is a property not possessed by the conventional Fresnel lens.

In claim 6, the lens is more specifically characterized in that "a diffractive lens power component of the surface with the plurality of areas defined by the plurality of steps has a sign identical to a sign of power of the whole diffractive lens". When the lens is designed such that the lens power component provided by the diffractive lens structure basically contributes directly to the refractive power of the whole lens, the refractive power of a refractive surface of an equivalent refractive lens can be provided by the diffractive lens. This enables a reduction in a surface curvature of the equivalent refractive lens and thus in the thickness of the lens.

In claim 7, the lens is more specifically characterized in that "the diffractive lens is a meniscus lens generally shaped to include a convex surface and a concave surface". When an equivalent original refractive lens to be converted into a diffractive lens is thinned, not only can the curvature be reduced but the surface can be made more concave to reduce an on-axis thickness. In this case, an actual axial occupied thickness of the lens is limited by a convex side face apex and a concave side lens edge portion instead of the on-axis thickness. Thus, formation of the concave surface makes little contribution. However, in mass production by plastic injection molding or the like, heat is easily radiated from the inside of resin, improving mass productivity.

In claim 8, the lens is more specifically characterized in that "the areas defined by the plurality of steps are at least 20 µm in a width from one step to another step". In mold machining with a diamond turning tool bit, when the annulus structure is excessively fine, machining fails to be achieved. Thus, a certain width is preferably ensured.

In claim 9, the lens is more specifically characterized in that "the plurality of steps are at least 4 μm in depth". As is the case with claim 8, in the mold machining with the diamond turning tool bit, excessively small depth may make machining difficult.

Claim 10 is characterized by "an optical apparatus using the diffractive lens recited in claim 1" The use of the lens of the present application allows the equivalent refractive lens to be thinned with performance of the refractive lens maintained. This enables a reduction in the weight and size of optical devices in general which use white light, such as cameras, projectors, and lighting devices which use a lens.

The decrease in diffraction efficiency in the case where the diffractive lens is used for white light as disclosed in JP-A-2001-249271 can be suppressed by eliminating the interference between the adjacent annuli to allow the lens to act as a Fresnel lens and suppress a reduction in efficiency. At this time, the diffractive lens is designed for the use of high-order diffracted light, which enables an increase both in annulus width and in step depth by a factor of the diffraction order compared to the use of first-order diffracted light. This facilitates machining of the mold using the diamond turning tool bit. Furthermore, the lens power can be increased, enabling contribution to the thinning of the lens as is the case with the Fresnel lens.

The aberration performance in the case where the Fresnel lens is used as disclosed in JP-A-2013-182264 and JP-A-2013-200367 can be easily optimized by the phase function design for the diffractive lens. Thus, the lens of the present application improves the optical performance compared to the Fresnel lens. Since the lens of the present application is a diffractive lens, a diffractive surface can be added to a curved surface with a normal lens power. Consequently, the lens of the present application increases the degree of freedom for the optical design and improves the optical performance compared to the Fresnel lens. Thus, in an existing optical system including a refractive lens, the thickness of the lens can be reduced by forming a lens surface with a large curvature into a completely optically equivalent envelope of a diffractive surface to reduce the curvature.

In summary, the lens equivalent to the conventional refractive lens can be thinned with the optical performance of the lens maintained. Thus, an inexpensive sophisticated lens with high mass productivity can be provided. Furthermore, for an optical device using the lens, the weight and size of the device can be reduced, allowing an inexpensive high-quality optical device to be provided.

BRIEF DESCRIPTION OF THE DRAWINGS

FIG. 2 is a diagram showing the annulus shape of a diffractive lens in Embodiment 1;

FIG. 13 is a diagram showing a coefficient for an annulus shape in Embodiment 2.

DESCRIPTION OF THE EMBODIMENTS

Embodiments will be described below using the drawings.

Embodiment 1

In the present embodiment, a lens for a lighting optical system will be described which collimates light from a light source and which is assumed to be, for example, a headlamp in an automobile.

Figure 1:
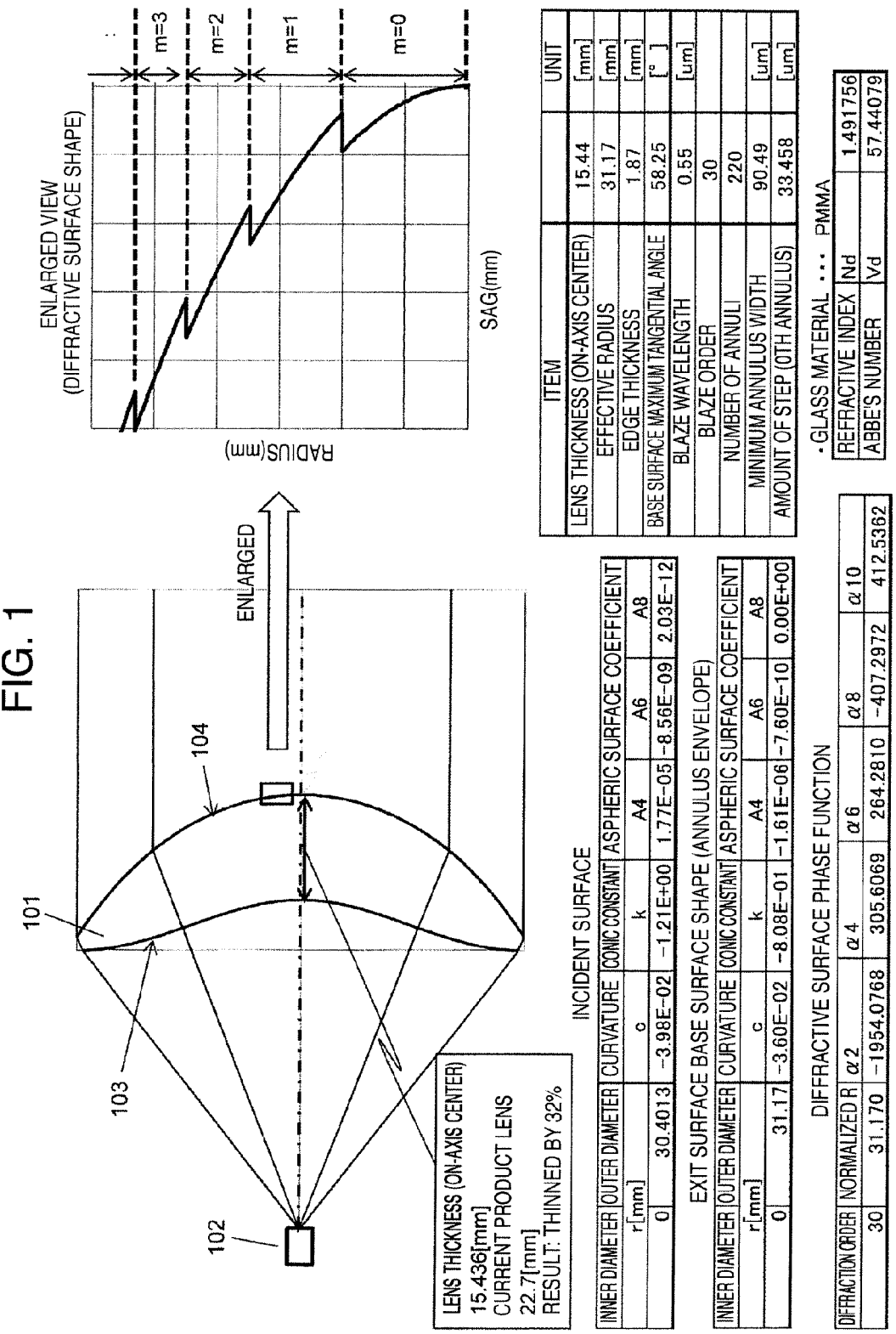
FIG. 1 is a diagram showing a diffractive lens in Embodiment 1.
Figure 3:
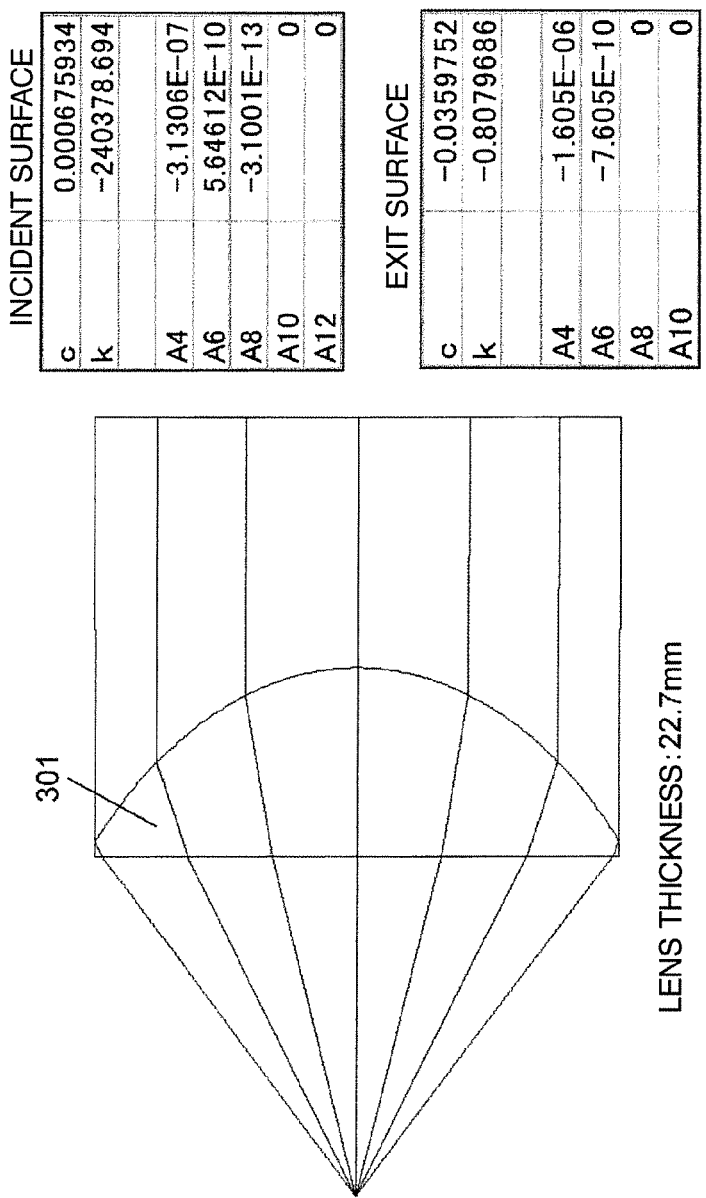
FIG. 3 is a diagram showing an original normal lens for which compatibility with the diffractive lens in Embodiment 1 is considered.

FIG. 1 is a diagram showing an example of the results of design of a diffractive lens in the present embodiment. A diffractive lens 101 is a lens that converts divergence light from a light source 102 into parallel light. A wedge shape is a meniscus lens with an incident surface 103 that is a concave surface and an exit surface 104 that is a convex surface. The lens is a diffractive lens designed to have functions equivalent to the functions of a normal lens shown in FIG. 3 with a focal distance of 57 mm and a diameter of 62 mm. On the exit surface 104, a diffractive lens shape is formed which is provided with axially symmetric annulus areas defined by steps as shown in an enlarged view of a surface shape of a central portion in FIG. 1. A diffraction order is 30th, the number of annuli is 220, an annulus width is 90 μm even at the narrowest point, and the height of a step is 33.5 μm at the innermost annulus. Such an annulus width and an annulus depth facilitate mold machining using a diamond turning tool bit. The shape of the incident surface and the shape of an envelope connecting the intermediate point of each annulus surface of the exit surface and the intermediate point of each step are expressed by Expression 1 representing an aspheric shape.

$$z(r) = \frac{cr^2}{1 + \sqrt{1-(k+1)c^2r^2}} + A_4 r^4 + A_6 r^6 + A_8 r^8 + A_{10} r^{10} \quad \text{[Expression 1]}$$

In Expression 1, the sagging quantity of the surface in a case where the direction of an optical axis is defined to be positive is denoted by z, a radius coordinate is denoted by r, a surface curvature is denoted by c, a conic constant is denoted by k, and aspheric surface coefficients are denoted by A4, A6, and A8. These values are shown in tables in the figure. Furthermore, this expression for the aspheric surface is similarly defined for an original lens in FIG. 3. An on-axis thickness is 22.7 mm for the normal lens and is 15.4 mm in the diffractive lens 101; the on-axis thickness is approximately 30% smaller in the diffractive lens than in the normal lens.

A phase function for a diffractive surface is a function that expresses a value for a phase applied to light transmitted through a surface (in this case, the exit surface side) to which the diffractive surface is added with respect to a radius coordinate ρ standardized in radians by the radius of the surface to which the diffractive surface is added. The phase function is defined by Expression 2.

$$\Phi = M \sum_{i=1}^{N} \alpha_i \rho^{2i}$$ [Expression 2]

In Expression 2, a phase value is denoted by Φ, a diffraction order is denoted by M, and a 2ith-order phase function coefficient is denoted by αi. A sign for Expression 2 is the same as a sign for an optical path difference. If a diffractive surface is added to a flat surface to form a lens that condenses incident parallel light like a convex lens, a geometric length from the diffractive surface to a focus is larger in a peripheral portion than on the optical axis. Thus, to make the optical path differences the same, a negative phase difference is applied to the diffractive surface. At this time, in making the phase front of light a converging spherical wave that travels to the focus, a component proportional to the square of the radius is dominant. Thus, the sign of a lens power based on the diffractive surface can be determined from the sign of a squared coefficient of the phase function. A table for the coefficients of the phase function in FIG. 1 illustrates that a 2nd-order coefficient α2 is negative, indicating that the diffractive surface added to the lens has a lens power appropriate to allow the lens to serve as a convex lens to converge light. This direction is the same as the direction of the lens power of the whole lens and acts to cancel a lens power in the opposite direction exerted by a first surface serving as a concave surface.

FIG. 2 is a diagram showing the surface shape of each annulus on the diffractive surface in FIG. 1. When a central circular area is defined as a 0th annulus and the other annuli are numbered like first, second, . . . starting with the innermost annulus, the mth annulus surface shape is expressed by the coefficients of a 6th-order exponential polynomial as in Expression 3. FIG. 2 shows the annulus number m=0 to 10 and 210 to 219.

$$z_m(r) = a_{m0} + a_{m2}r^2 + a_{m4}r^4 + a_{m6}r^6 (r_{m-1} < r < r_m)$$ [Expression 3]

In Expression 3, the sagging quantity of a surface of the mth annulus surface for which the optical axis direction is positive is denoted by $z_m$, a 0th-order surface coefficient of the mth annulus is denoted by $a_{m0}$, a 2nd-order surface coefficient of the mth annulus is denoted by $a_{m2}$, a 4th-order surface coefficient of the mth annulus is denoted by $a_{m4}$, a 6th-order surface coefficient of the mth annulus is denoted by $a_{m6}$, an inner boundary radius of the mth annulus is denoted by $r_{m-1}$, and an outer boundary radius of the mth annulus is denoted by $r_m$. The outer boundary radius of the mth annulus is the same as the inner boundary radius of the m+1th annulus. The above-described annulus surface shape results from conversion of the phase function for the diffractive lens. In this case, annulus boundaries are determined by setting radius positions at which the phase function value is divided at intervals of M·λB as a boundary radius. An annulus envelope is allowed to intersect at a radius coordinate corresponding to an intermediate phase value for the annulus boundary. Based on the condition that the optical path difference is Mλ at the annulus boundary, the surface coefficient for each annulus surface is determined.

Figure 4:
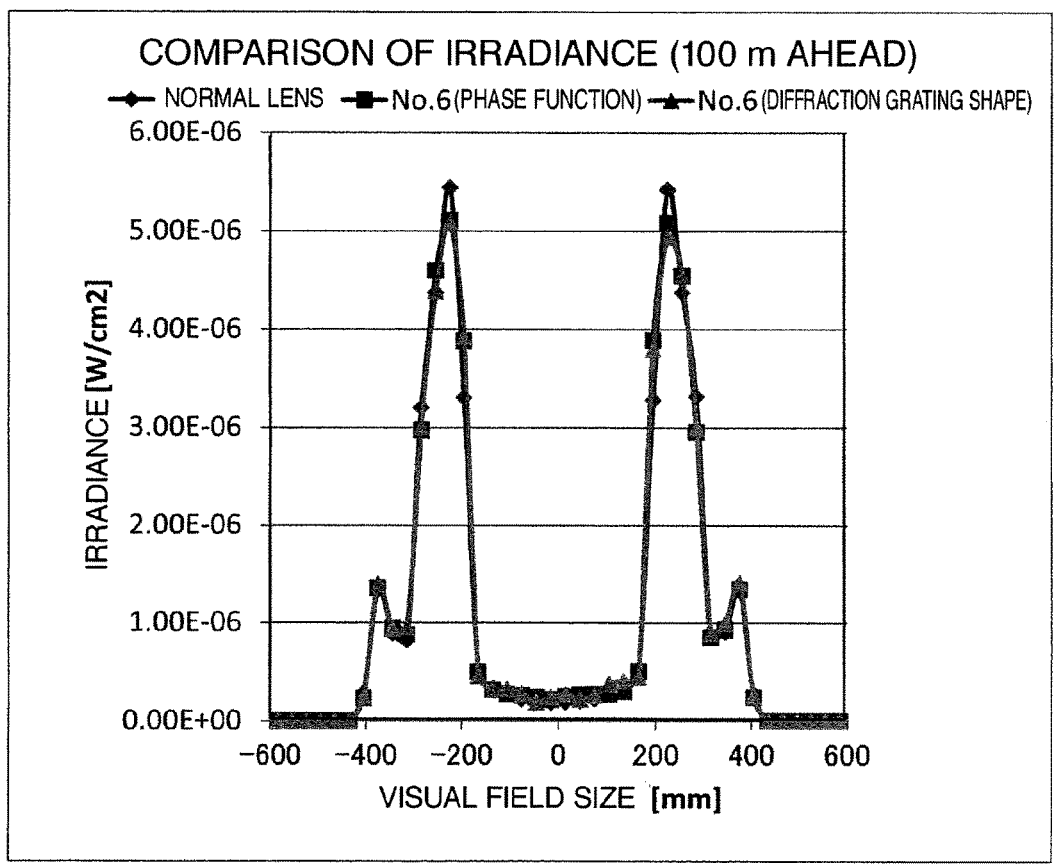
FIG. 4 is a diagram showing a comparison of results of irradiance simulation in Embodiment 1.

FIG. 4 is a diagram showing the results of calculation of irradiance formed 100 m ahead by light from a point light source with a blaze wavelength. FIG. 4 indicates that the normal lens and the diffractive lens exhibit substantially the same properties. For the diffractive lens, FIG. 4 shows a combination of the results of calculation using the phase function and the results of calculation for the surfaces following conversion of the phase function into the annulus surface shape. These calculations assume the light source used to be a white LED or the like. The non-use of the blaze wavelength prevents the calculation results for the phase function from agreeing with the calculation results for the annulus surface shape of the diffraction grating. This is because, while the calculation for the phase function is intended for a ray of light from a diffractive lens with a particular diffraction order, the calculation for the annulus surface shape is intended for a geometric-optical diffraction angle unrelated to the diffraction order. This will be described below.

Figure 5:
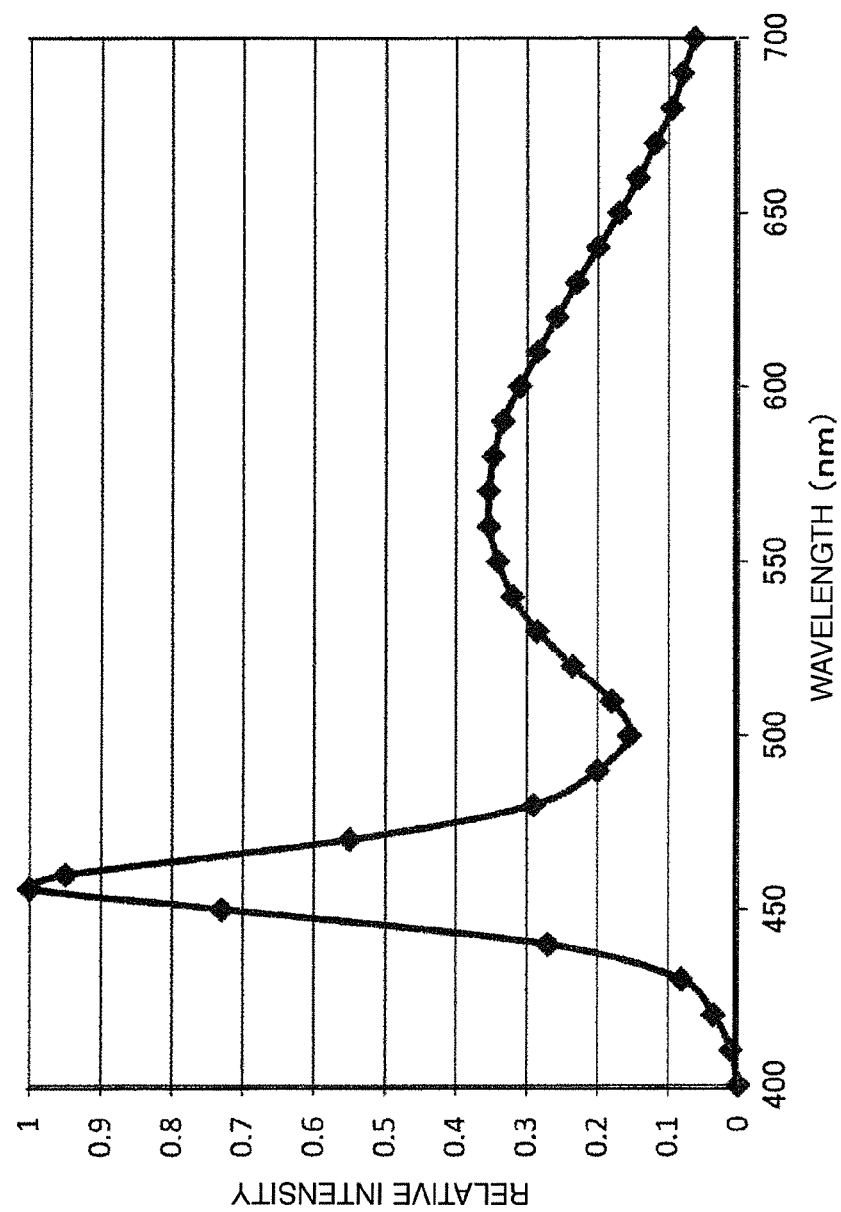
FIG. 5 is a diagram showing an example of a white LED light source spectrum used in Embodiment 1.

FIG. 5 is a diagram showing an example of a wavelength spectrum of the white LED used. For the white LED, white light is obtained by mixture with fluorescence with a large wavelength generated by a phosphor irradiated with light from a blue LED. Thus, the spectrum is shaped such that a peak is present at a blue color and spreads and overlaps a red color. When, based on FIG. 5, the blaze wavelength is determined to be 500 nm and the half Δλ width of the spectrum at an intensity of 1/e^2 is determined to be 120 nm, the needed optical path difference recited in claim 2 is approximately 2.1 μm. In contrast, in the present embodiment, the height of the step is 33.5 μm, and thus, the optical path difference is determined to be 16.4 μm by multiplying the height of the step by the difference of between the refractive index of the resin material, 1.49, and the refractive index of air, 0.49. Therefore, the optical path difference is sufficiently larger than 2.1 μm. It is thus expected that rays of light transmitted through different annuli do not interfere with each other and that the transmitted light follows the results of geometric-optical ray tracing. If the diffraction order is selected so as to marginally correspond to the above-described estimated coherence length, then 2100/500=4.2 for a blaze wavelength of 500 nm and it is expected that the diffraction order needs to be at least 5th. The annulus step of a fifth-order blaze diffraction grating is 0.5 μm×5th/0.49=5.1 μm given that the blaze wavelength is 500 nm.

Figure 6:
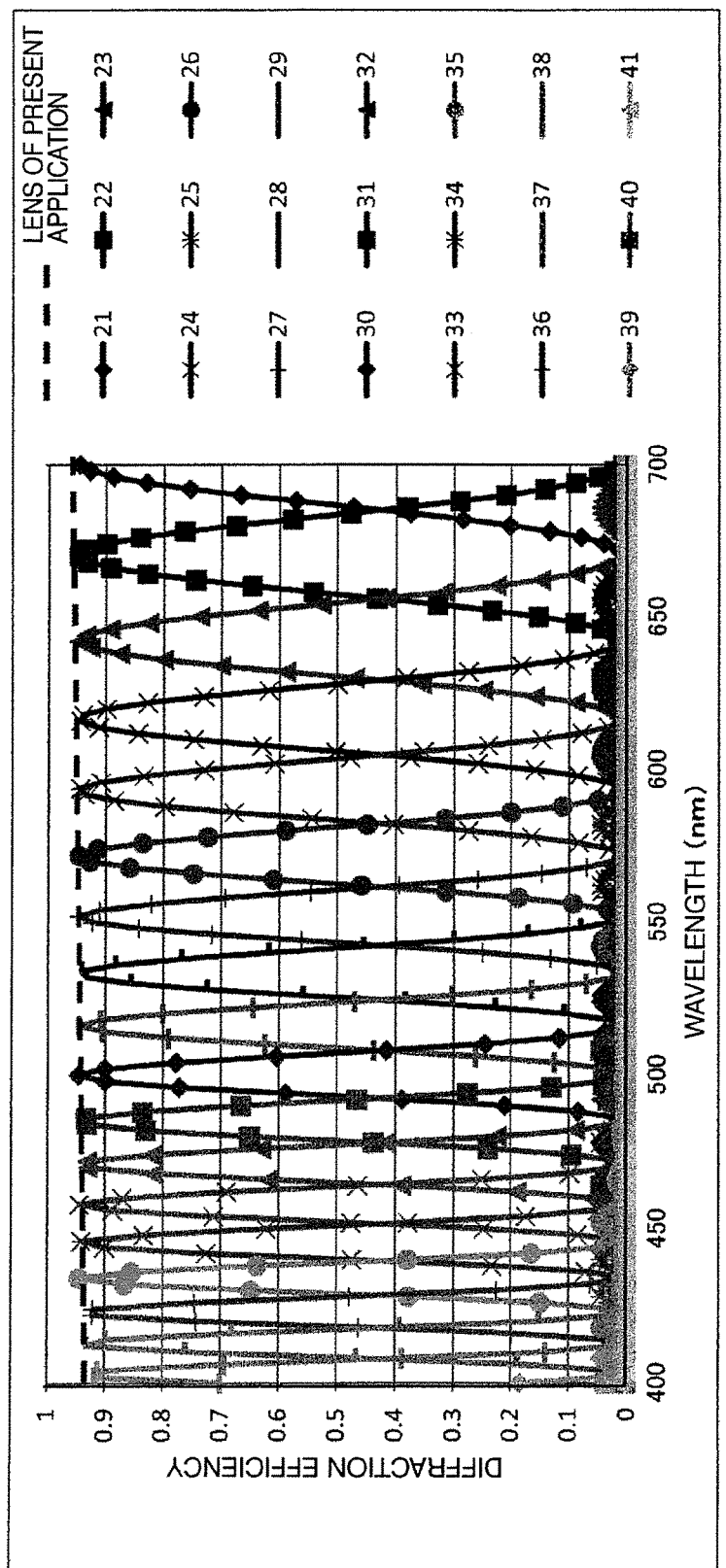
FIG. 6 is a diagram showing the results of simulation of the wavelength dependence of diffraction efficiency of a diffraction grating in Embodiment 1.

FIG. 6 is a diagram showing calculation results for the wavelength distribution of diffraction efficiency of a uniform regular-interval linear blaze diffraction grating with a grating pitch of 90 μm, a blaze wavelength of 500 nm, and a 30th blaze order, in accordance with the diffractive lens in the embodiment. The axis of abscissas indicates the wavelength, the axis of ordinate indicates the diffraction efficiency, and legend numbers indicate the diffraction order. FIG. 6 indicates that, in a high-order diffraction grating, diffraction efficiency of each order has a peak within a narrow wavelength range. Diffracted light of the 30th blaze order has the maximum diffraction efficiency near 500 nm as specified. In spite of the use of the blaze diffraction grating, the diffraction efficiency of the peak of each order fails to reach 1. This is because, when a ray of light refracted by a sawtooth wave-like concave and convex shape is refracted by a grating slope, the ray of light is actually geometrically blocked by the step in some areas. In this case, a material for the grating was assumed to be PMMA (acrylic), and a blaze depth was 29.4 µm. The blaze depth depends on the diffraction angle, and in a strict sense, has a value varying according to the position of the annulus. Thus, the diffraction efficiency of diffracted light of a particular order from the diffractive lens decreases rapidly when the wavelength deviates from the blaze wavelength of that order. In contrast, in the lens of the present invention, the peaks of the respective orders are connected together as shown by a dashed line in FIG. 6, enabling high diffraction efficiency to be continuously maintained over a wide wavelength range. A slight inclination of the connected peaks is due to an increase in the area blocked by the step portions which increase is consistent with an increase in the diffraction angle at a small wavelength based on a wavelength dispersion property of the index of retraction.

Figure 7:
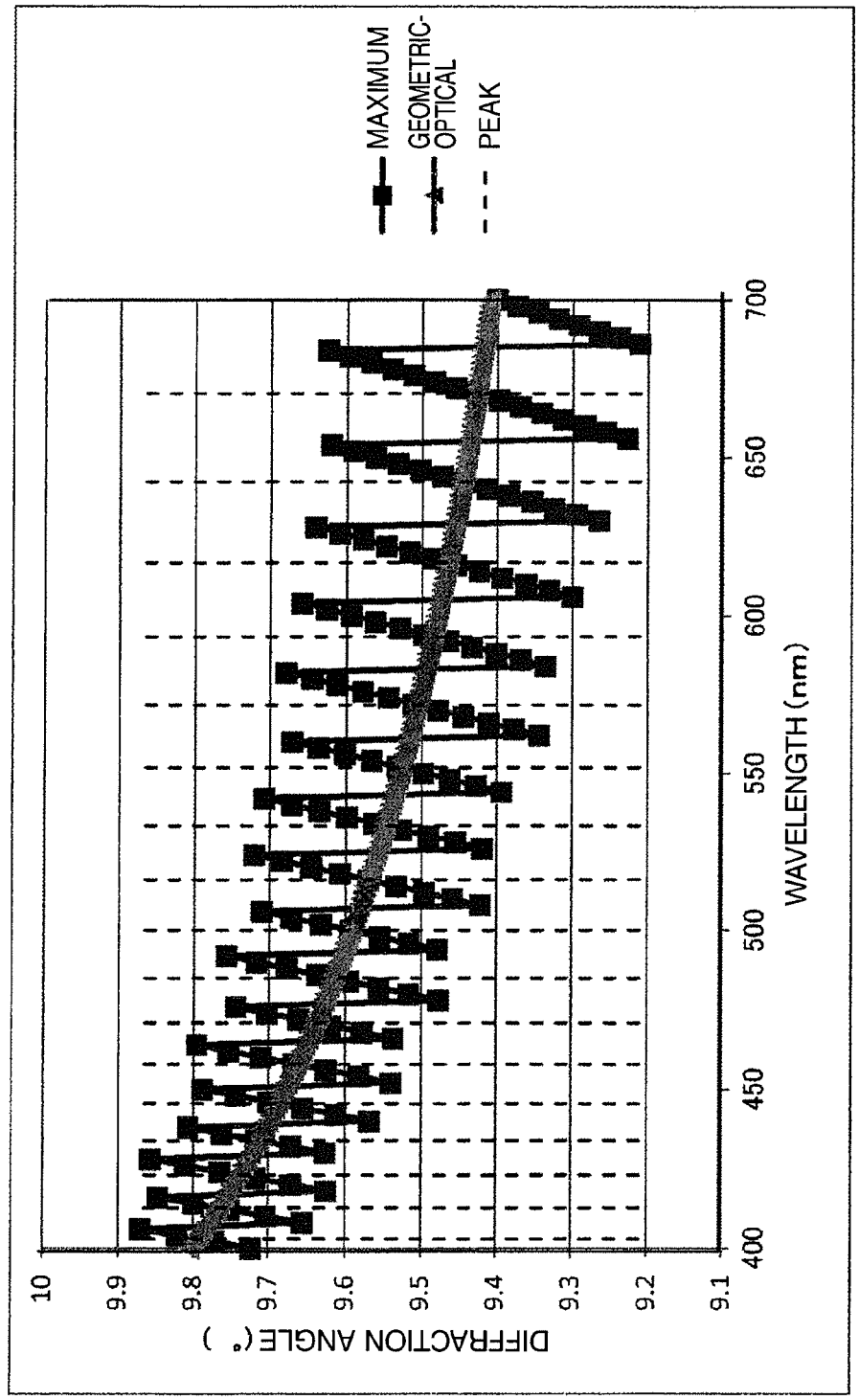
FIG. 7 is a diagram showing the results of simulation of the wavelength dependence of a diffraction angle of the diffraction grating in Embodiment 1.

FIG. 7 is a diagram showing, with respect to the wavelength, calculation results for the diffraction angle through which a ray of light perpendicularly incident on the grating surface of the blaze diffraction grating for which the diffraction efficiency is shown in FIG. 6. A zigzag curve with a square legend indicates the diffraction angle of diffracted light of the order with the maximum diffraction efficiency. A smooth downward-sloping curve with a triangular legend indicates the geometric-optical diffraction angle of the diffractive surface determined with the wavelength dispersion property of the grating material taken into account. The ray of light is considered to be geometric-optically retracted when the optical path difference between the annuli is larger than the coherence length of light, enabling the assumption that no interference occurs between the annuli. In this state, the lens acts as a Fresnel lens. Vertical dashed parallel lines indicate wavelength positions where light of each diffraction order has a peak value of diffraction efficiency, that is, the lines indicate blaze wavelengths, as shown in FIG. 6. The curve of the diffraction angle of the maximum diffraction efficiency has the zigzag and the steps because the diffraction angle varies according to the order, so that the diffraction order of the maximum diffraction efficiency discontinuously shifts to the adjacent order at the wavelength at the position of each step of the curve. As is also understood from these results, each zigzag curve, the smooth downward-sloping curve, and the corresponding vertical straight dashed line constantly intersect one another at one point, indicating that the diffraction angle of the order of the maximum diffraction efficiency is equal to the diffraction angle of geometric-optical refracted ray of light at the blaze wavelength. Thus, even under the condition that the optical path difference between the annuli is longer than the coherence length of light, preventing possible light interference, the lens produces the same lens effect as that of the diffractive lens. This indicates that the lens is still a diffractive lens at the blaze wavelength. Consequently, lens design for the diffractive lens is possible at the blaze wavelength, and the refraction angle at a wavelength deviating from the blaze wavelength is, in a strict sense, different from the diffraction angle of the diffractive lens but is considered to correspond to the average diffraction angle of diffracted light of a plurality of orders. This enables optical design that can be adequately used in spite of wavefront aberration.

Furthermore, in contrast, when a high-order diffractive lens is used for a light source with a large coherence length, diffracted light with a diffraction angle rapidly changing zigzag is generated. Thus, such a diffractive lens is not suitable for a lighting optical system or an image forming optical system. However, when a light source with a small coherence length is used to prevent possible interference, a property with a smoothly changing diffraction angle is obtained as is the case with the normal lens, facilitating design for achromaticity.

Furthermore, in connection with a chromatic aberration property, the diffractive lens of the present application is different from the normal diffractive lens. In FIG. 7, the diffraction angle of diffracted light with the maximum diffraction efficiency for the diffraction grating constantly slopes upward except for discontinuous points where the order jumps, whereas the geometric-optical refracted ray of light constantly slopes downward. This indicates that, for the direction of a change in wavelength in which chromatic aberration occurs, the direction of the chromatic aberration in the diffractive lens is opposite to the direction of the chromatic aberration in the diffractive lens of the present application with possible interference between the annuli in the refractive and diffractive lenses prevented. This also indicates that the direction of the chromatic aberration in the diffractive lens of the present application is the same as the direction of the chromatic aberration in the normal refractive lens.

Application of the diffractive lens of the present application to an optical device such as an automobile headlamp allows the lens to be thinned with the optical performance of the existing lens maintained, enabling a reduction in the size and weight of the device. Furthermore, the reduced thickness of the lens member enables a reduction in cooling time in a mold forming process, improving the production in existing facilities to enable a relative reduction in manufacturing costs. This leads to a reduction in the price of the optical device utilizing the lens.

Embodiment 2

The present embodiment is an embodiment of a lens used for an optical system in a liquid crystal projector which irradiates a liquid crystal modulation element with output light from a LED.

Figure 8:
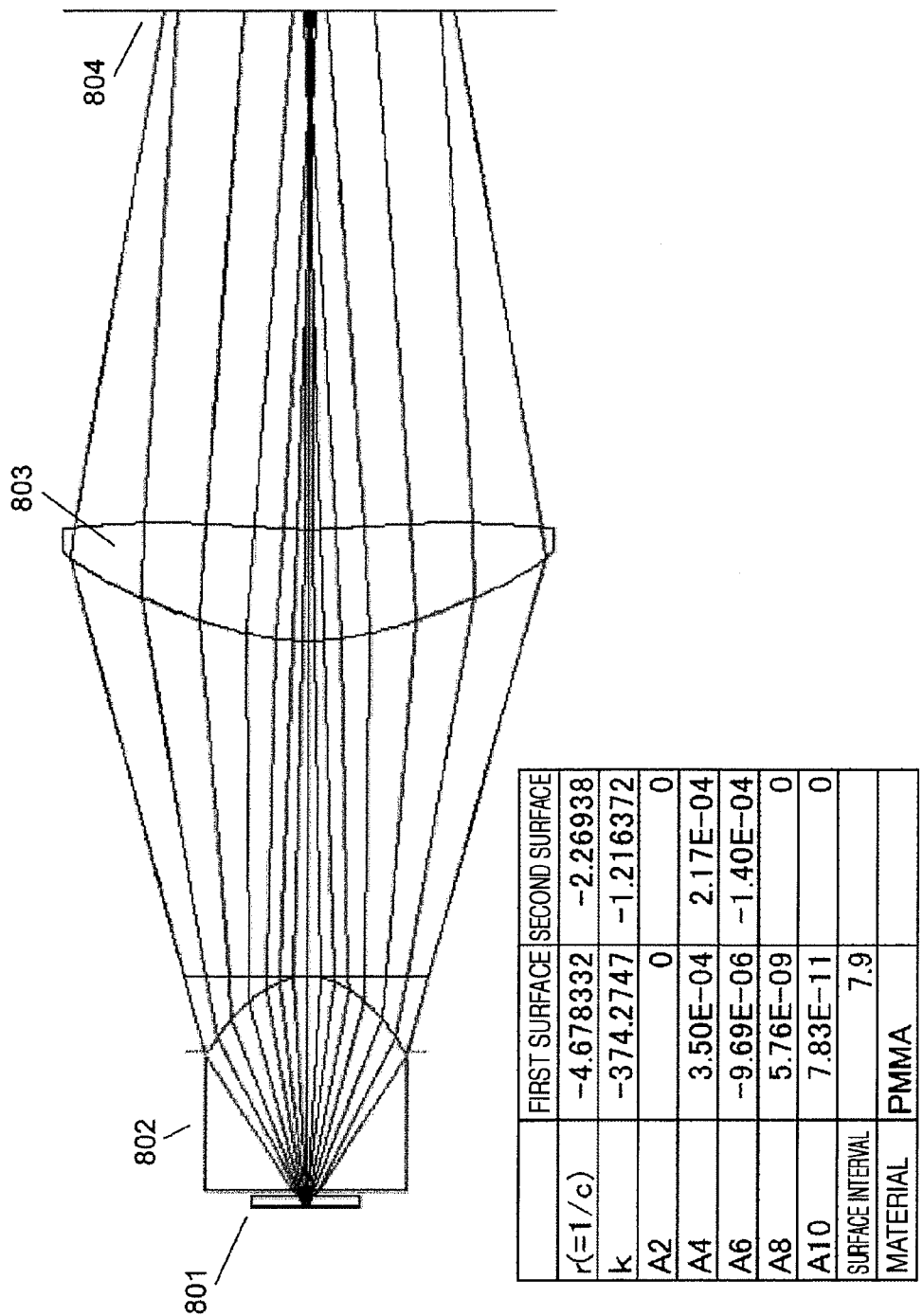
FIG. 8 is a configuration diagram of a projector lighting optical system including an original normal lens with which Embodiment 2 is compatible.

FIG. 8 is a diagram showing an example of a normal lens that is a model for the present embodiment. This optical system irradiates a diffusion plate surface 804 with light from a monochromatic LED light source 801 via a first lens 802 and a second lens 803. The thicker first lens 802 is replaced with the diffractive lens of the present application by being thinned. A lens material is PMMA, and a lens shape and an on-axis lens thickness are as shown in FIG. 8. A surface shape is described in accordance with an asphericity expression illustrated in Expression 1. These values indicate the first lens has a focal distance of 4.3 mm. FIG. 8 shows one-color LED optical system for simplification. However, in actual use, a wavelength synthesis prism is used between a lens 803 and a diffusion surface 804 to synthesize light at three wavelengths from similar optical systems to simultaneously irradiate the same diffusion plate 804 with the three wavelengths.

Figure 9:
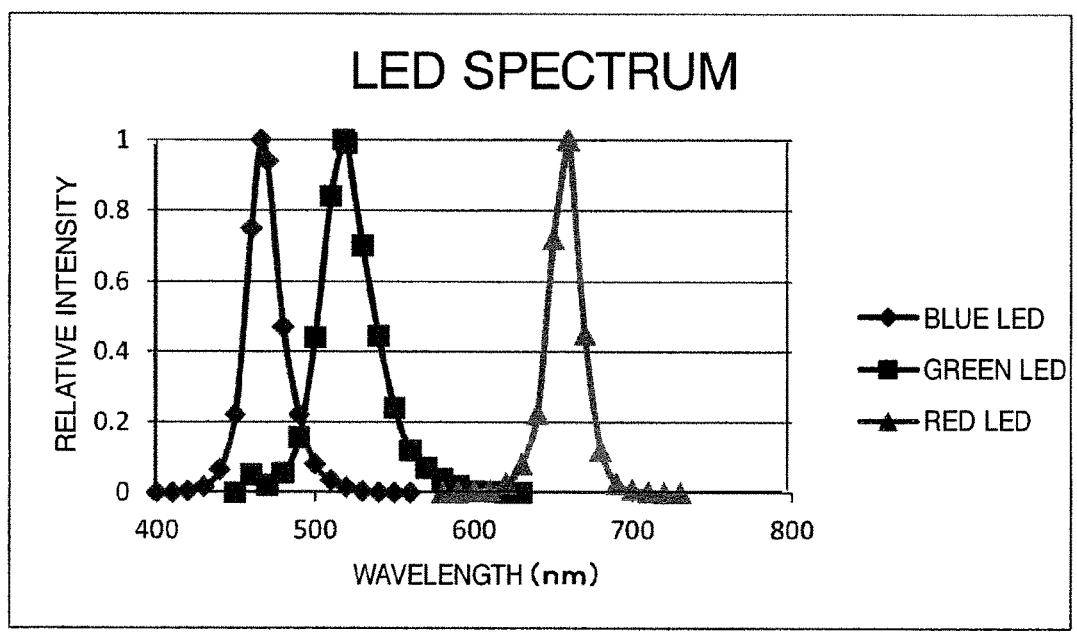
FIG. 9 is a diagram showing an example of wavelength spectra of three color LEDs used in Embodiment 2.

FIG. 9 shows an example of wavelength spectra of monochromatic LEDs in three colors, blue, green, and red. The LEDs are monochromatic, but unlike semiconductor lasers, each has a wavelength spread. For example, for the wavelength of green, a peak wavelength is 520 nm, and the half width of a wavelength spectrum is approximately 40 nm. Thus, the coherence length is estimated to be $0.52^2/$ 0.04=6.8 µm, and a diffractive lens with possible interference prevented can be implemented by setting the optical path difference between annuli to approximately 13λ with respect to the wavelength of green.

Figure 10:
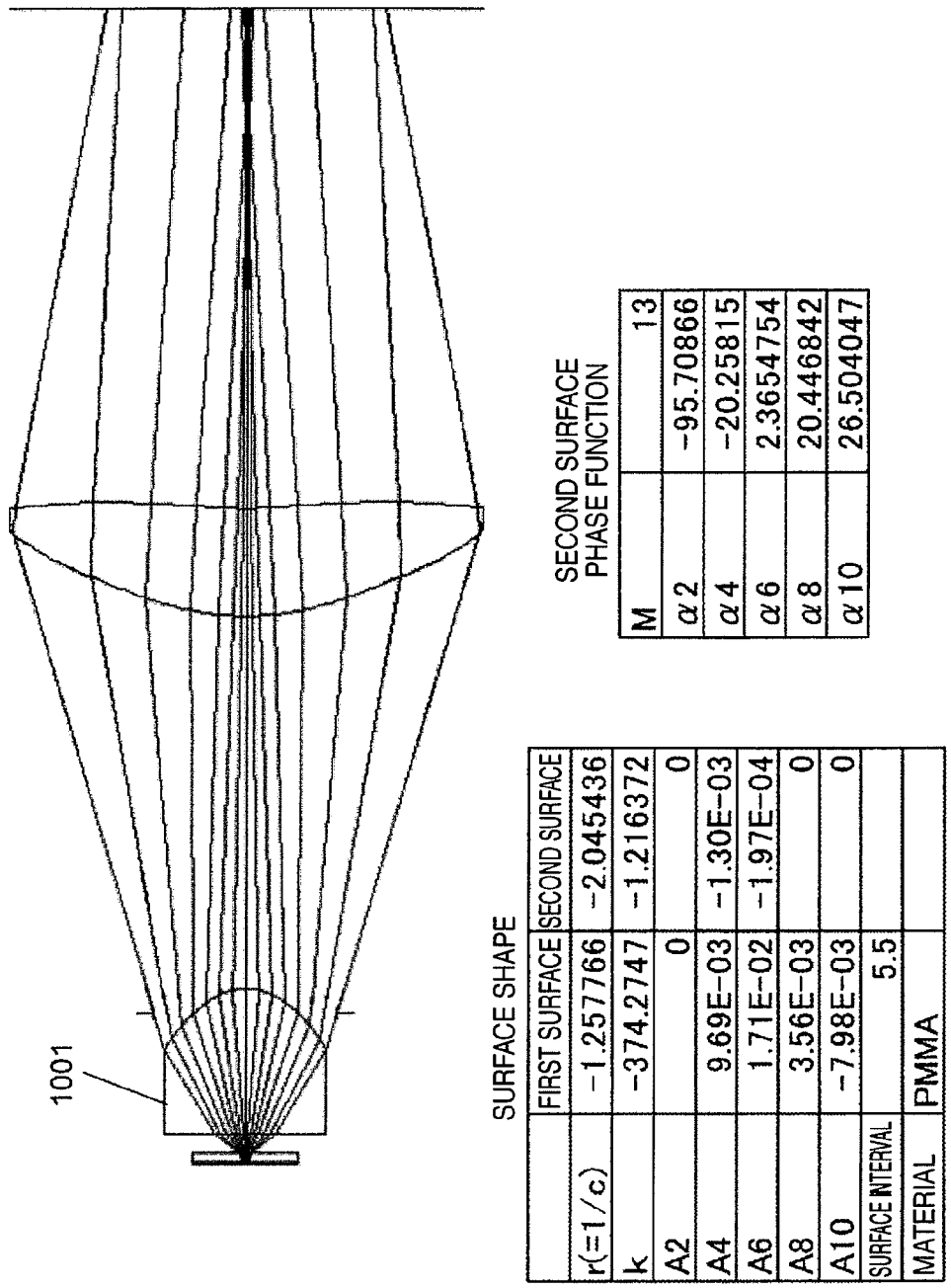
FIG. 10 is a diagram showing an example of the results of ray tracing for the diffractive lens in Embodiment 2 using a phase function.

FIG. 10 is a diagram showing the results of design of a diffractive lens 1001 with the same lens effect as that of the first lens 803 in FIG. 8 using the phase function. The negative radius of curvature of a first surface indicates that the center of curvature of the surface lies on an incident side with respect to the surface and that the first surface is a concave surface. Thus, the diffractive lens 1001 as a whole is shaped like a meniscus lens. The lens thickness has been reduced to 5.5 mm. The diffractive surface is expected to be formed on an exit surface side second surface of the lens. The surface shape of each surface and the coefficients of a diffractive lens phase function on a second surface are as shown in FIG. 10. In this case, the negative sign of a 2nd-order coefficient α2 of the phase function indicates that the diffractive surface has a positive lens power that allows the lens to act as a convex lens. Therefore, the diffractive surface has the same sign as that of the power component of the whole lens.

Figure 11:
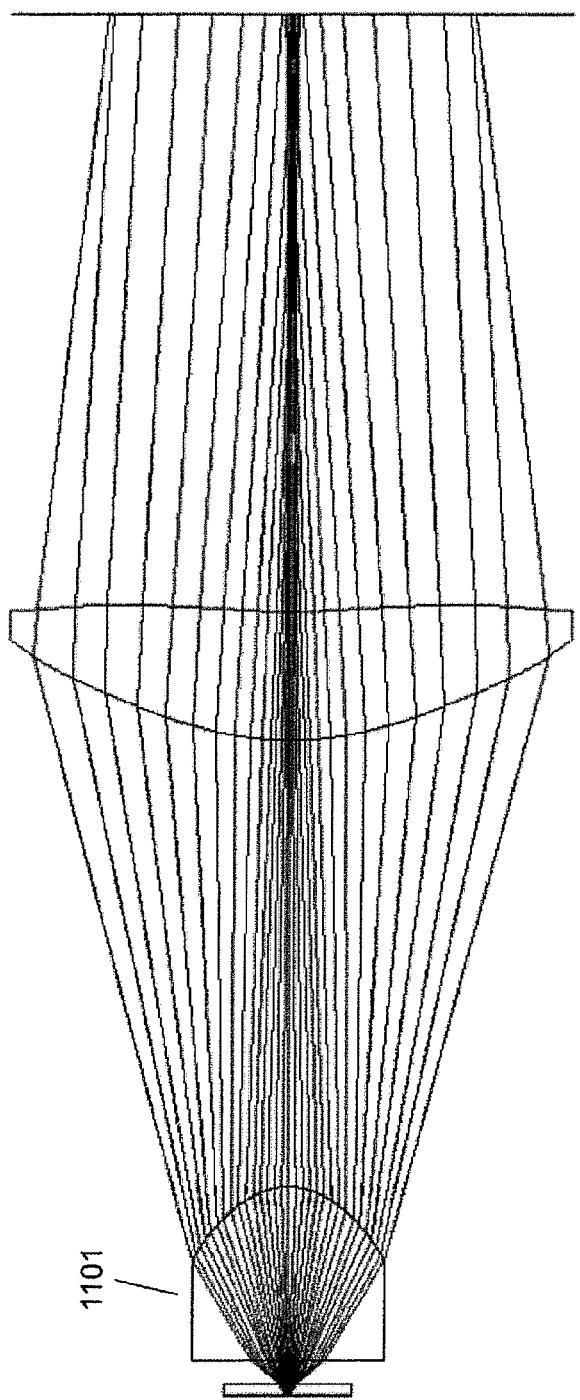
FIG. 11 is a diagram showing an example of the results of ray tracing for the diffractive lens in Embodiment 2 using the results of annulus shape design.

FIG. 11 is a diagram showing the results of design in which the results of design using the phase function in FIG. 10 are converted into an annulus surface shape. FIG. 11 indicates that optical properties equivalent to the optical properties in FIG. 8 have successfully been achieved.

Figure 12:
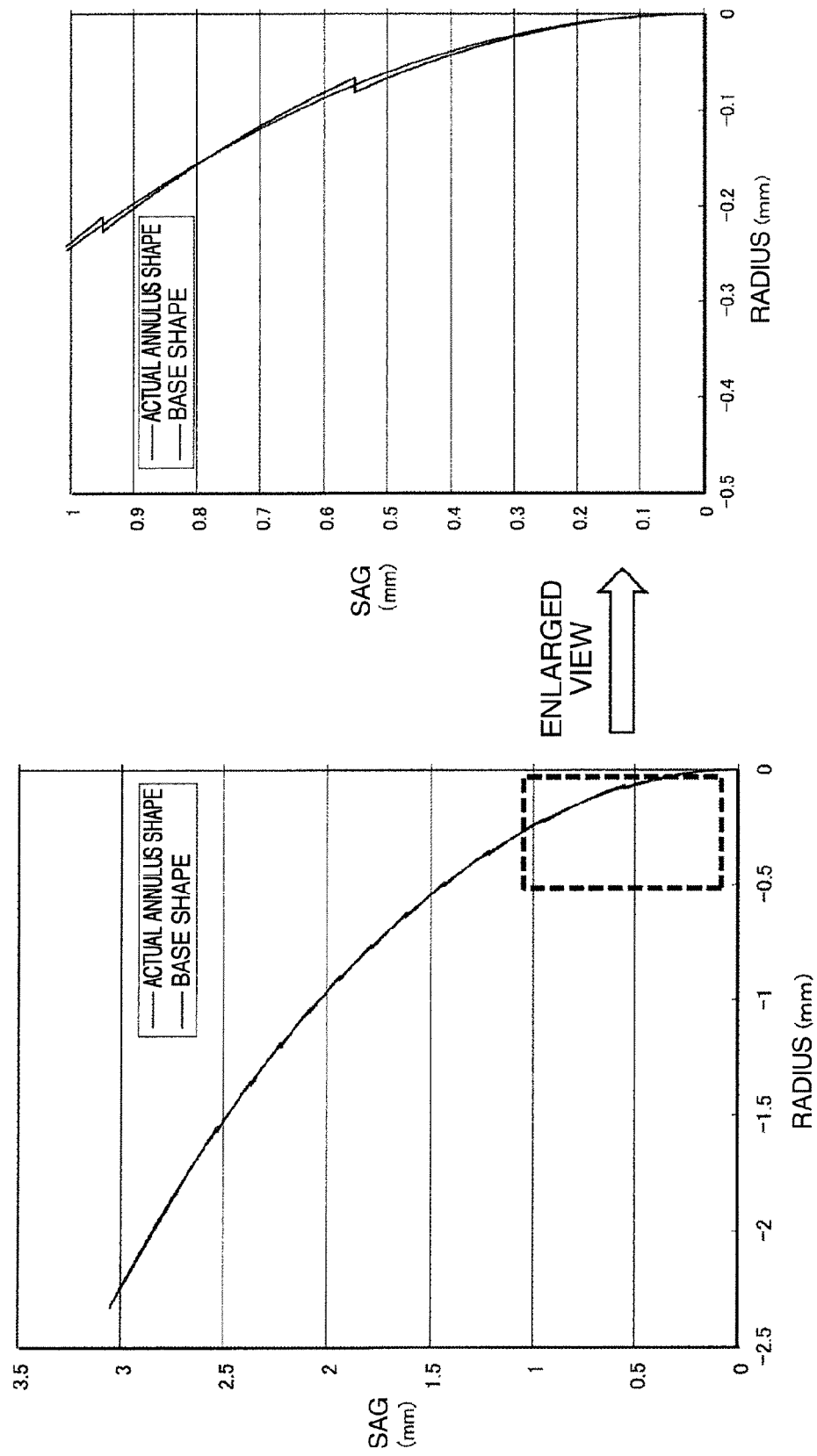
FIG. 12 is a diagram showing an example of the results of diffractive surface shape design in Embodiment 2.

FIG. 12 is a diagram (left figure) of a whole diffractive surface shape of the diffractive lens 1101 in FIG. 11 and an enlarged view (right figure) of the vicinity of the optical axis of the diffractive lens 1101. In FIG. 12, the annulus surface shape is superimposed on a base aspheric shape with no diffractive surface formed thereon. FIG. 12 indicates that the diffractive surface coincides with the base surface at the center of the annulus and at the center of the step.

FIG. 13 is a diagram showing coefficients of the annulus surface shape. FIG. 13 indicates that the number of annuli is 25 and that an annulus width is at least 40 µm. An outermost circumference has a small annulus width, but in actuality, an annulus can be continuously formed outside an effective diameter, and thus, no machining problem is posed.

Figure 14:
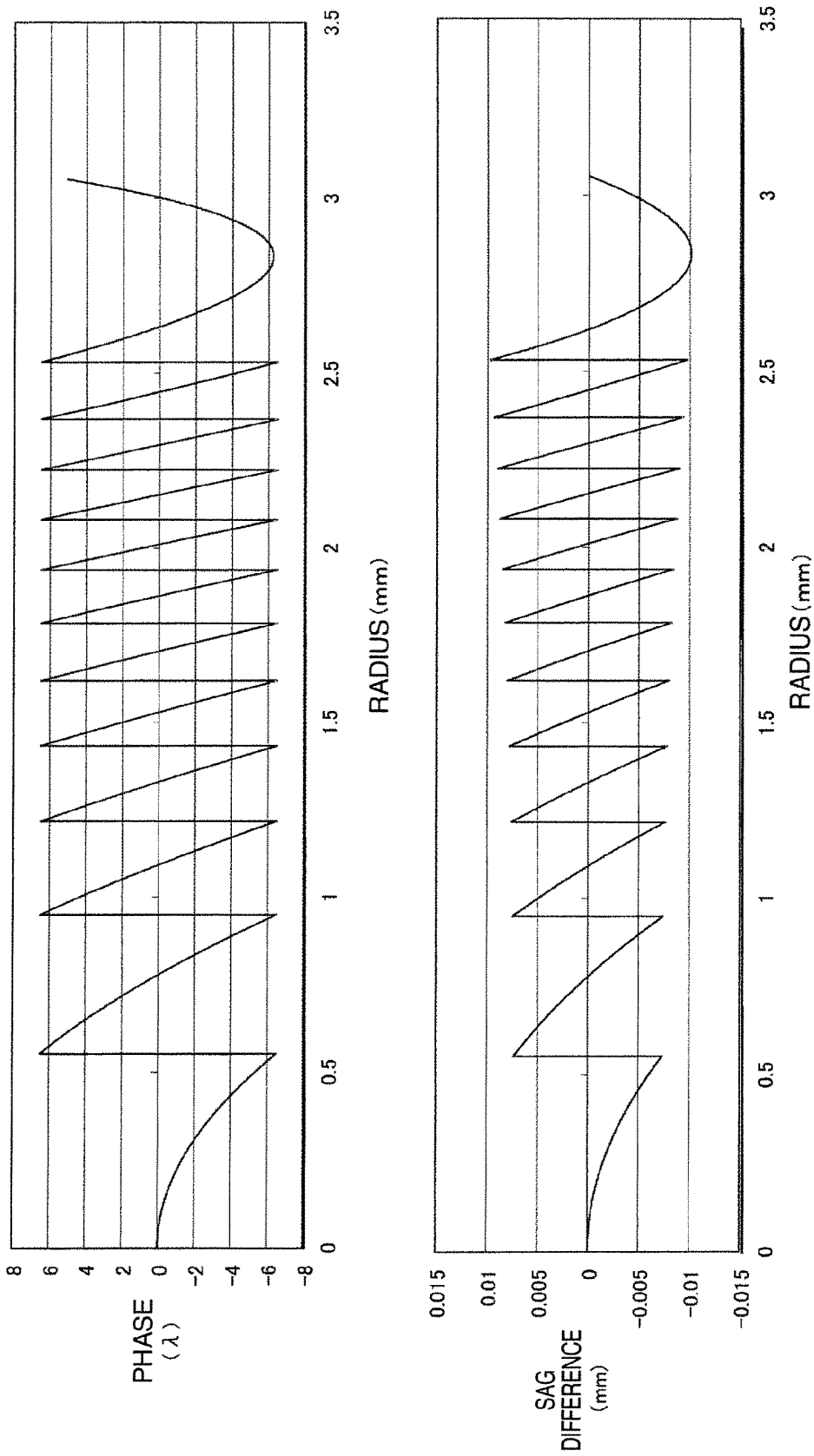
FIG. 14 is a diagram showing a phase distribution of 13th-order diffracted light in Embodiment 2 (upper figure) and a deviation of an annulus shape from a base aspheric shape (lower figure).

FIG. 14 shows a phase added by the diffractive lens (upper figure) and a shape deviation (sagging quantity) of the annulus surface from the base surface shape (lower figure). The diffraction order is 13th, and thus, the phase is folded at a phase function value of ±6.5λ, indicating a phase difference of 13λ occurs between the adjacent annuli. This in turn indicates that the formation of the shape deviation between the base surface and the annulus surface reflects an additional phase distribution as described above. However, in a peripheral portion, the surface has a larger inclination, increasing the amount of step needed to make a given phase difference.

Application of the diffractive lens of the present application to a lighting optical system such as a projector allows the lens to be thinned with the conventional lens performance maintained, enabling a reduction in the size and weight of the device. Furthermore, the reduced thickness of the lens member enables a reduction in cooling time in the mold forming process, improving the production in the existing facilities to enable a relative reduction in manufacturing costs. This leads to a reduction in the price of the optical device utilizing the lens.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical apparatus comprising, a light source and a diffractive lens for diffracting a light from the light source,
wherein the diffractive lens includes an optical surface with a plurality of areas defined by a plurality of steps,
wherein the light source is set on an optical axis of the diffractive lens and at a focal point of the diffractive lens,
wherein a spectral intensity of the light source has a first peak at a first wavelength and a second peak lower than the first peak at a second wavelength longer than the first wavelength,
wherein a blaze wavelength $\lambda_B$ of the diffractive lens is within a wavelength spectral range of the light source,
wherein when the wavelength spectral range of the light source is defined by a range $2\Delta\lambda$ with a spectral intensity that is $1/e^2$ of a spectral intensity of the first wavelength, an optical path difference between adjacent areas is equal to or more than $\lambda_B^2/\Delta\lambda$ with respect to a blaze wavelength $\lambda_B$,
wherein a first envelope enveloping the steps on the optical surface with the plurality of areas has an on-axis curvature different from an on-axis curvature of a surface opposing the optical surface and a diffractive lens power component of the optical surface with the plurality of areas defined by the plurality of steps has a sign identical to a sign of power of the diffractive lens, and
wherein, in a cross section which passes the optical axis and is parallel to the optical axis, a second envelope connecting respective intermediate points of the optical surfaces of the plurality of areas and respective intermediate points of the plurality of steps has an aspheric shape.

2. The optical apparatus according to claim 1, wherein the light source is a non-laser light source in which the wavelength spectral range is at least 200 nm, and the optical path difference is at least five times as large as the blaze wavelength.

3. The optical apparatus according to claim 1, wherein the areas are concentric annulus areas.

4. The optical apparatus according to claim 1, wherein the diffractive lens is a meniscus lens generally shaped to comprise a convex surface and a concave surface.

5. The s optical apparatus according to claim 1, wherein the areas defined by the plurality of steps are at least 20 µm in a width from one step to another step.

6. The optical apparatus according to claim 1, wherein the plurality of steps are at least 4 µm in depth.

7. The optical apparatus according to claim 1, wherein the light source is a white LED irradiating a white light by irradiating a blue light from a blue LED to a phosphor.

8. The optical apparatus according to claim 1, wherein first wavelength corresponding to blue.

9. The optical apparatus according to claim 1, wherein the surface opposing to the optical surface has an aspheric shape.

10. The optical apparatus according to claim 1, wherein the optical surface provides a negative phase difference to light passing through the optical surface.

11. An optical apparatus comprising, a light source and a diffractive lens for diffracting a light from the light source,
wherein the diffractive lens includes an optical surface with a plurality of areas defined by a plurality of steps, wherein the light source is set on an optical axis of the diffractive lens and at a focal point of the diffractive lens, wherein a spectral intensity of the light source has peaks at a first wavelength corresponding to blue, at a second wavelength corresponding to green, and at a third wavelength corresponding to red, wherein a blaze wavelength $\lambda_B$ of the diffractive lens is within a wavelength spectral range of the light source, wherein when the wavelength spectral range of the light source is defined by a range $2\Delta\lambda$ with a spectral intensity that is $1/e^2$ of a spectral intensity of a peak wavelength, an optical path difference between adjacent areas is equal to or more than $\lambda_B^2/\Delta\lambda$ with respect to a blaze wavelength $\lambda_B$ and the peak wavelength is one of the first wavelength, the second wavelength and the third wavelength, wherein a first envelope enveloping the steps on the optical surface with the plurality of areas has an on-axis curvature different from an on-axis curvature of a surface opposing the optical surface and a diffractive lens power component of the optical surface with the plurality of areas defined by the plurality of steps has a sign identical to a sign of power of the diffractive lens, and wherein, in a cross section which passes the optical axis and is parallel to the optical axis, a second envelope connecting respective intermediate points of the optical surfaces of the plurality of areas and respective intermediate points of the plurality of steps has an aspheric shape.

12. The optical apparatus according to claim 11, wherein the surface opposing to the optical surface has an aspheric shape.

13. The optical apparatus according to claim 11, wherein the optical surface provides a negative phase difference to light passing through the optical surface.

* * * * *